Nov. 9, 1965  S. E. ELLIOTT ETAL  3,217,289
SIGNAL ANALYSIS
Filed Aug. 18, 1961  3 Sheets-Sheet 1
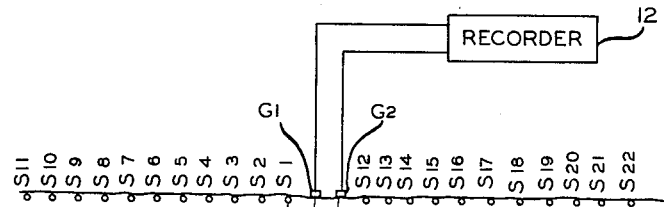
FIG. 1
INVENTORS
S. E. ELLIOTT
J. P. LINDSEY
BY
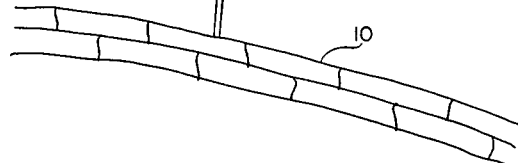
ATTORNEYS Nov. 9, 1965 S. E. ELLIOTT ETAL 3,217,289
SIGNAL ANALYSIS
Filed Aug. 18, 1961 3 Sheets-Sheet 2

INVENTORS
S. E. ELLIOTT
J. P. LINDSEY
BY
Hudson & Young
ATTORNEYS

United States Patent Office 3,217,289
Patented Nov. 9, 1965

3,217,289
SIGNAL ANALYSIS
Sheldon E. Elliott and Joe P. Lindsey, Bartlesville, Okla., assignors to Phillips Petroleum Company, a corporation of Delaware
Filed Aug. 18, 1961, Ser. No. 132,428
4 Claims. (Cl. 340—15.5)

This invention relates to the identification of selected vibration patterns in signals which contain noise vibrations. In another aspect it relates to the interpretation of seismic signals.

In various analysis systems there is a need for procedures which are capable of recognizing preselected vibration patterns in electrical signals. One example of such a need occurs in the field of seismic prospecting. The desired reflection patterns in recorded seismic signals are often obsecured by the presence of random noise vibrations. While various schemes have been proposed for modifying and manipulating these records to increase the signal to noise ratio, it finally becomes necessary to identify individual peaks in the records which are representative of the desired reflections. Heretofore, this has generally been accomplished by an operator visually observing the individual peaks. It is readily apparent that such a system can be both time consuming and the subject of various errors.

One specific problem that is encountered in seismic prospecting is the determination of travel times of vibrations which move downwardly from the surface of the earth and are reflected back from subterranean formations. The travel times from a common shot point to adjacent seismometers are often appreciably different because the vibrations travel through beds having different transmission velocities. These different travel times must be known in order to compare records received by a plurality of geophones.

In accordance with the present invention, a procedure is provided for comparing common vibration patterns in a plurality of signals to determine the relative times at which the patterns occur. This is accomplished by cross correlation functions which are made with the signals displaced from one another by progessively different amounts. An averaging procedure is provided to measure maximum correlation in the resulting functions.

Accordingly, it is an object of this invention to provide a system for measuring differences between travel times of selected vibrations in a plurality of seismic records.

Another object is to provide a system for identifying preselected vibration patterns in the presence of random noise vibrations.

A further object is to provide a system for minuplating seismic records so as to identify selected reflection patterns in the presence of random noise vibrations.

Other objects, advantages and features of the invention will become apparent from the following description which is taken in conjunction with the accompanying drawing in which:

FIGURE 1 is a schematic representation of a seismic exploration system.

Figure 2:
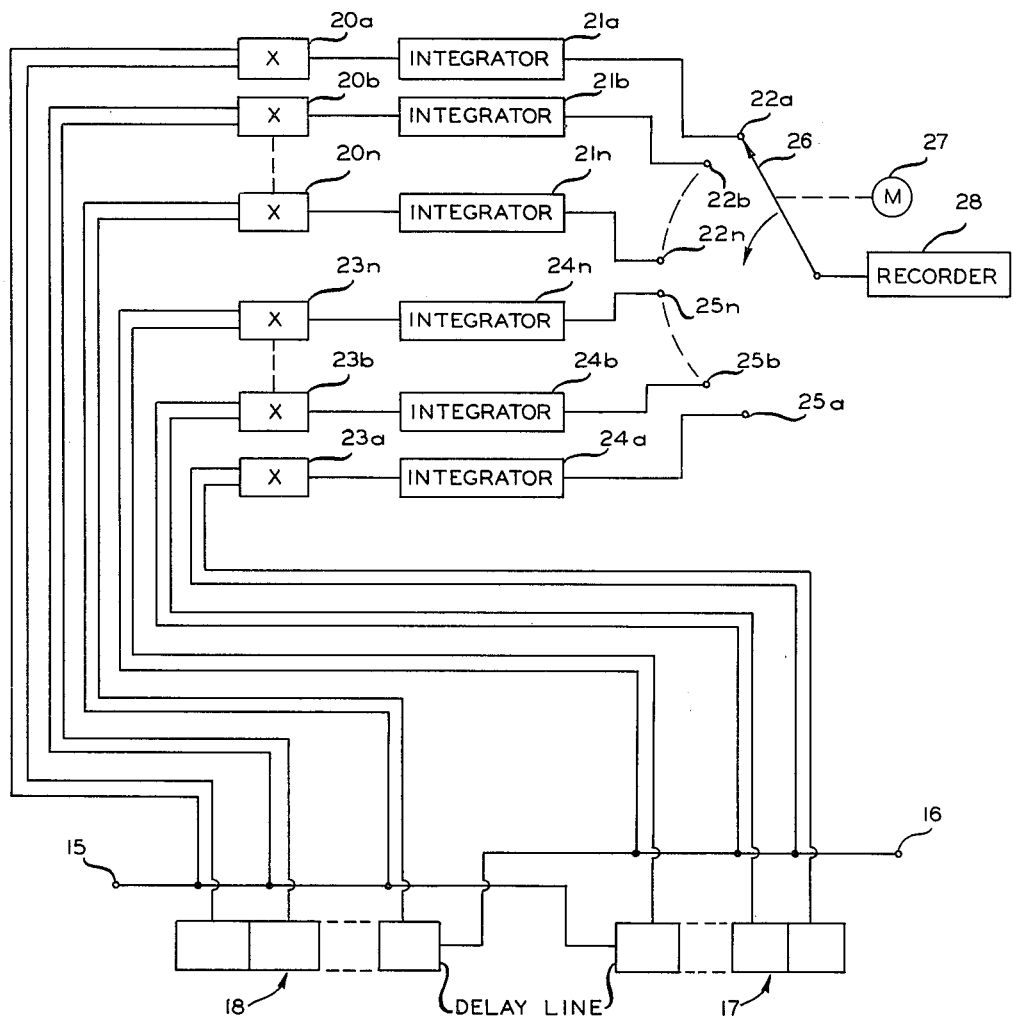
FIGURE 2 is a schematic circuit drawing of apparatus employed to correlate the signals obtained by the system of FIGURE 1.

This invention will be described in conjunction with the interpretation of seismic signals. However, it will become apparent that certain features of the invention are by no means limited to this function, but can be applied to the analysis of electrical signals from any sources.

Referring now to the drawing in detail and to FIGURE 1 in particular, a seismic exprolation system is illustrated schematically. Vibrations are imparted to the earth in sequence at a plurality of locations identified as shot points $S_1$ to $S_{22}$. This can readily be accomplished by detonating explosive charges at the corresponding shot points. The resulting vibrations travel downwardly through the earth and are reflected back to the surface from subterranean formations, such as 10. These vibrations are received at the surface of the earth by a plurality of geophonse which are spaced on both sides of each shot point. In order to simplify the drawing, only two such geophones $G_1$ and $G_2$ are illustrated. However, in normal practice a relatively large number of these geophones are positioned on both sides of each shot point. Vibrations emitted from shot point $S_1$ are reflected from bed 10 and returned to respective geophones $G_1$ and $G_2$. Although not shown, vibrations from the remainder of the geophones $S_2$ to $S_{22}$ are also received in sequence by geophones $G_1$ and $G_2$.

It has been discovered that relatively shallow beds 11 often exist which transmit seismic vibrations at greatly varying rates. For example, these beds can be formed of materials which have been leached in part by subsurface fluids so as to leave slumps. In addition, these beds often vary in thickness so that the times of travel of the seismic vibrations through the beds at different locations vary considerably. Because of these beds, the travel times of vibrations from a common shot point to adjacent geophones often differ substantially. This makes the recognition of common reflection patterns in these several signals extremely difficult, if not impossible. The present invention provides a system for measuring the difference in travel times of the several reflections through bed 11. These times are shown as $t_1$ and $t_2$ for the vibrations received by respective geophones $G_1$ and $G_2$. Reflecting bed 10 is a considerable distance below bed 11. Thus, the downwardly moving vibrations follow substantially the same path through bed 11 and have the same travel times. Similarly, since bed 11 is close to the surface, the reflected vibrations received by geophones $G_1$ and $G_2$ from any of the shot points travel through substantially the same paths in bed 11 and have travel times $t_1$ and $t_2$, respectively.

The signals received by geophones $G_1$ and $G_2$ are applied to respective channels of a recorder 12. Magnetic tape recorders can be utilized to advantage for this purpose because the signals can readily be reproduced for subsequent manipulation. The signal received by geophone $G_1$ is subsequently reproduced and applied to input terminal 15 of FIGURE 2. The recorded signal from geophone $G_2$ is simultaneously reproduced and applied to input terminal 16. Actually, these signals are applied between terminals 15 and 16 and a reference potential, such as ground. However, single terminals are illustrated in FIGURE 2 to simplify the drawing. Terminals 15 and 16 are connected to the inputs of respective delay lines 17 and 18. These delay lines are provided with a plurality of spaced output terminals so as to provide a plurality of output signals which represent sequential values of the respective input signals. These delay lines can be conventional tapped electrical delay lines, for example. Input terminal 15 and the last output terminal of delay line 18 are applied as the respective inputs to a first multiplier 20a. The output of multiplier 20a is applied through an integrator 21a to a terminal 22a. Input terminal 15 and the remainder of the output terminals of delay line 18 are applied as respective inputs to a series of multipliers 20b ... 20n. The outputs of multipliers 20b ... 20n are applied through respective integrators 21b ... 21n to respective terminals 22b ... 22n. In a similar manner, input terminal 16 and the outputs of delay line 17 are applied as respective inputs to a plurality of multipliers 23a, 23b ... 23n. The outputs of multipliers 23a, 23b ... 23n are applied through respective integrators 24a, 24b ... 24n to respective terminals 25a, 25b ... 25n. A switch 26 is rotated by a motor 27 to engage the terminals in sequence. Switch 26 is connected to the input of a recorder 28.

Figure 3:
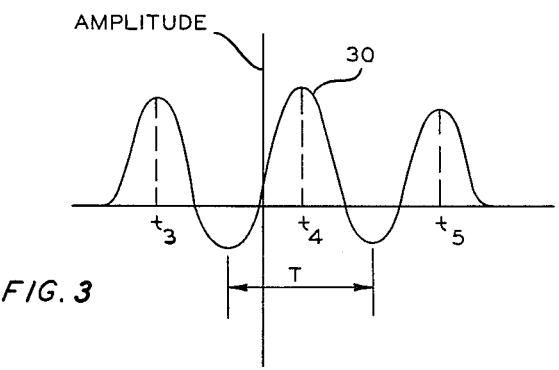
FIGURE 3 is a graphical representation of a typical output signal from the circuit of FIGURE 2.

The two input signals which are applied to terminals 15 and 16 are thus correlated with one another at various time differences therebetween. This correlation is a cross correlation wherein the individual signals are multiplied and the resulting product is integrated. The resulting signal applied to recorder 28 may have the configuration shown by curve 30 of FIGURE 3, for example. FIGURE 3 is a graphical representation of the amplitude of the signal applied to recorder 28 as a function of the time difference between increments of the individual input signals that are multiplied together. The positive time values, in effect, represent the amount one signal is delayed from the other when the correlation is performed, and the negative time values represent the amount the signals are delayed in the reverse order. Under ideal circumstances, curve 30 of FIGURE 3 exhibits a single maximum peak which is clearly defined. When this occurs, the time at which this maximum appears is representative of the difference in time at which common reflections from bed 10 appear in the signals which are received at geophones $G_1$ and $G_2$. This is the desired information which can then be used to displace the original recorded signals from one another before they are reproduced to provide a single composite record. This time difference is the compensation required for all static corrections. Of course, angularity of path corrections still must be made in the usual manner. However, as shown in FIGURE 3, several peaks often appear in curve 30 which make it difficult, if not impossible to identify the correct displacement time.

Figures 4A, 4B:
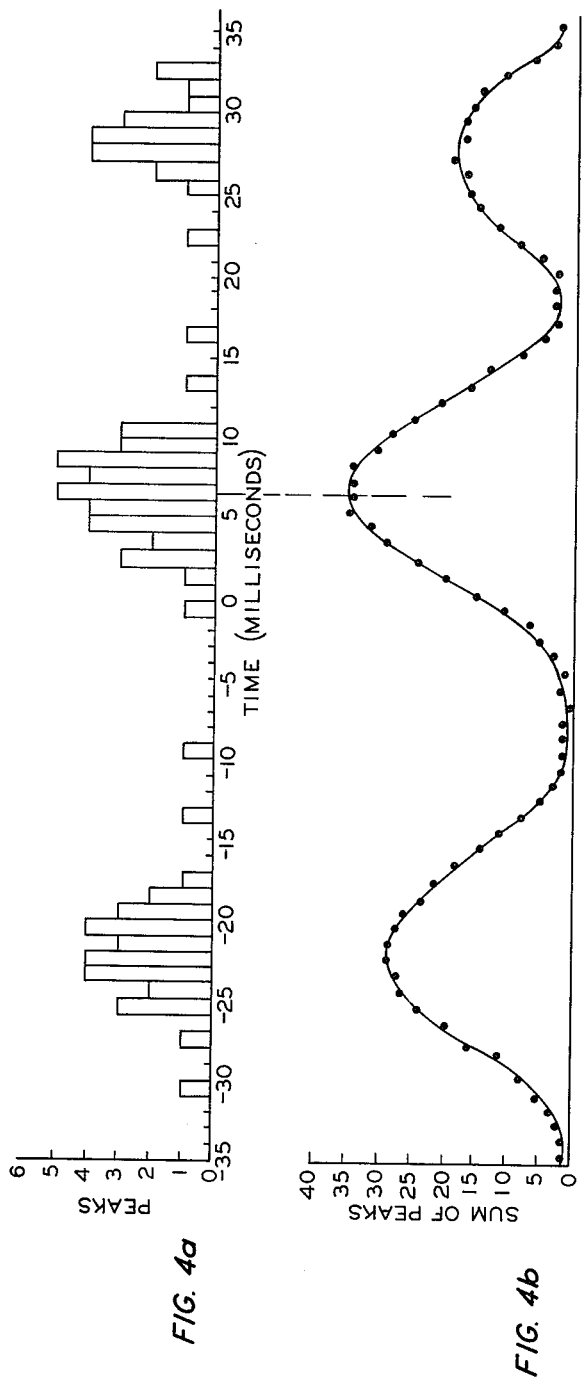
FIGURE 4a is a representation of a typical signal produced by summing information obtained from a plurality of signals of the type shown in FIGURE 3.
FIGURE 4b is a representation of a typical output signal which is obtained by the procedure of this invention.

The next step in the procedure of this invention is to pick the time of occurrence of the correct maximum correlation of the signals received by geophones $G_1$ and $G_2$. This is accomplished by an averaging procedure utilizing a plurality of records of the type shown in FIGURE 3. Referring again to FIGURE 1, charges are detonated in sequence at shot points $S_2$ to $S_{22}$ and the corresponding vibrations received by geophones $G_1$ and $G_2$ are recorded. This provides twenty-one additional pairs of records which are correlated in the manner previously described to obtain a total of twenty-two signals of the type shown in FIGURE 3. It should be evident that more or fewer signals can be used. However, the accuracy of the correlation is increased by employing a large number of signals. A histogram of the type shown in FIGURE 4a is then prepared from these twenty-two signals. The total number of positive peaks which occur within each millisecond interval are plotted as a function of time. For example, in FIGURE 3, peaks occur at times $t_3$, $t_4$ and $t_5$.

The final step of the procedure of this invention is to determine the time at which the maximum of the histogram occurs. This is accomplished by an averaging method. The period of a typical peak of curve 30 is first estimated. This is represented as time T in FIGURE 3, which may be twenty-four milliseconds, for example. The total counts in each interval of $T/2$, twelve milliseconds, of the histogram of FIGURE 4a, are plotted as a function of the time at the center of the interval to produce the curve of FIGURE 4b. For example, the twelve millisecond interval centered at −35 milliseconds in FIGURE 4a includes only one count, which appears at −31 milliseconds. The next step is to pick the time of the maximum value of the curve of FIGURE 4b. It will be assumed that this time occurs at +6 milliseconds. The final step ins to compute any error which may have occurred in picking this peak time. This is accomplished by calculating the "center of gravity" of the histogram extending for time $T/2$ on each side of the time +6 milliseconds. The height of each peak to the right is multiplied by its time (milliseconds) from time +6 and the resulting products are summed to give a value of +46. The same procedure is repeated on the left side of time +6 to give a value of −42. The difference is +4. This value of +4 is then divided by the sum (37) of the peak values in the twenty-four millisecond interval. The quotient, +0.018, is added to the original picked value of +6 milliseconds to give the correct peak time of 6.108 milliseconds. This is the difference between the travel times of the signals received by geophones $G_1$ and $G_2$ in FIGURE 1.

As previously mentioned, the difference between travel times compensates for all of the static corrections in seismic prospecting. The foregoing procedure can be repeated at each adjacent pair of geophones to give a series of time corrections. A plurality of the seismic records can then be summed, for example, after the static time corrections are made. As is well known, such a summing procedure increases the signal to noise ratio because random noise vibrations tend to cancel one another.

In view of the foregoing description, it can be seen that an improved procedure is provided in accordance with this invention for correlating common vibration patterns in a plurality of electrical signals. While the invention has been descrcibed in conjunction with a presently preferred embodiment, it should be evident that it is not limited thereto.

What is claimed is:
1. The method of seismic surveying which comprises imparting vibrations to the earth sequentially at a plurality of first locations spaced from one another, separately recording vibrations reflected from subterranean formations to second and third locations adjacent one another at the surface of the earth resulting from each of the vibrations being imparted to the earth so as to provide a plurality of pairs of signals, each pair of signals being representative of vibrations imparted to the earth from a respective first location, multiplying the individual signals of said pairs of signals directly by one another with a plurality of time relationships therebetween, integrating each of the resulting products, and sequentially sampling the integrals of the products for each pair of signals, thereby measuring the degree of correlation between the individual signals of said pairs of signals at a plurality of time relationships therebetween.

2. The method of seismic surveying which comprises imparting vibrations to the earth sequentially at a plurality of first locations spaced from one another, separately recording vibrations reflected from subterranean formations to second and third locations adjacent one another at the surface of the earth resulting from each of the vibrations being imparted to the earth so as to provide a plurality of pairs of signals, each pair of signals being representative of vibrations imparted to the earth from a respective first location, multiplying the individual signals of said pairs of signals directly by one another with a plurality of time relationships therebetween, integrating each of the resulting products, sequentially sampling the integrals of the products for each pair of signals, and averaging the sampled values of the integrals of said pairs of signals, thereby measuring the degree of correlation between the individual signals of said pairs of signals at a plurality of time relationships therebetween.

3. The method of seismic surveying which comprises imparting vibrations to the earth sequentially at a plurality of first locations spaced from one another, separately recording vibrations reflected from subterranean formations to second and third locations adjacent one another at the surface of the earth resulting from each of the vibrations being imparted to the earth so as to provide a plurality of pairs of signals, each pair of signals being representative of vibrations imparted to the earth from a respective first location, multiplying the individual signals of said pairs of signals directly by one another with a plurality of time relationships therebetween, integrating each of the resulting products, sequentially sampling the integrals of the products for each pair of signals, and forming a histogram from the sampled values of the integrals by plotting the total number of peak values of the sampled values at each of a plurality of time intervals as a function of the time intervals, the resulting peak value of the histogram being representative of the time relationship of maximum correlation between the plurality of signals.

4. The method of seismic surveying which comprises imparting vibrations to the earth sequentially at a plurality of first locations spaced from one another, separately recording vibrations reflected from subterranean formations to second and third locations adjacent one another at the surface of the earth resulting from each of the vibrations being imparted to the earth so as to provide a plurality of pairs of signals, each pair of signals being representative of vibrations imparted to the earth from a respective first location, multiplying the individual signals of said pairs of signals directly by one another with a plurality of time relationships therebetween, integrating each of the resulting products, sequentially sampling the integrals of the products for each pair of signals, forming a histogram from the sampled values of the integrals by plotting the total number of peak values of the sampled values at each of a plurality of time intervals as a function of the time intervals, and measuring the time of the average maximum value of the histogram by summing the peak values of the histogram for a preselected time interval centered about each time interval of the histogram, the average peak value of the histogram being representative of the time relationship of maximum correlation between the plurality of signals.

References Cited by the Examiner
UNITED STATES PATENTS

| | | | |
|---|---|---|---|
| 2,676,206 | 4/54 | Bennett et al. | |
| 2,794,966 | 6/57 | McCarty | 340—15.5 |
| 2,854,191 | 9/58 | Raisbeck. | |
| 2,907,400 | 10/59 | Swafford | 181—.5 |
| 2,920,306 | 1/60 | Feagin et al. | 181—.5 X |
| 3,014,551 | 12/61 | Feagin et al. | 181—.5 |

SAMUEL FEINBERG, *Primary Examiner.*

KATHLEEN H. CLAFFY, ALDRICH F. MEDBERY,
*Examiners.*